United States Patent [19]

Shields

[11] Patent Number: 5,790,401
[45] Date of Patent: Aug. 4, 1998

[54] TEACH PENDANT FOR AN INDUSTRIAL ROBOT

[75] Inventor: Joseph J. Shields, Milwaukee, Wis.

[73] Assignee: ABB Flexible Automation, Inc., New Berlin, Wis.

[21] Appl. No.: 576,128

[22] Filed: Dec. 21, 1995

[51] Int. Cl.$^6$ .................................................. G05B 19/00
[52] U.S. Cl. ........................ 364/191; 345/161; 345/169; 318/568.11
[58] Field of Search .................................... 364/188, 190, 364/191, 167.01, 184, 474.07, 474.22, 474.23; 395/82, 86, 95, 96, 99; 318/568.11, 567, 568.19, 563; 219/89, 110; 345/151–155, 156–161, 169

[56] References Cited

U.S. PATENT DOCUMENTS

| | | | |
|---|---|---|---|
| 4,535,207 | 8/1985 | Lindqvist | 200/17 R |
| 4,888,708 | 12/1989 | Brantmark et al. | 395/99 |
| 5,079,491 | 1/1992 | Nose et al. | 364/188 |
| 5,182,557 | 1/1993 | Lang | 345/161 |
| 5,541,622 | 7/1996 | Engle et al. | 345/161 |
| 5,579,033 | 11/1996 | Holmgren | 345/153 |
| 5,675,361 | 10/1997 | Santilli | 345/168 |

*Primary Examiner*—James P. Trammell
*Assistant Examiner*—Shah Kaminis
*Attorney, Agent, or Firm*—Godfrey & Kahn, S.C.

[57] ABSTRACT

An operating unit for a programmable industrial robot. The operating unit includes a body and a display screen mounted on the body. The display screen is operable to present graphical information items, is capable of producing a display screen output, and an operator may make selections of the items presented on the display screen. A joystick ball is mounted on the body for controlling the robot during a programming phase during which the robot is taught to follow an operating path. The joystick ball has a joystick mounting means and is capable of producing a joystick ball output. A pointing device is removably mounted to the joystick mounting means and is capable of being used to make selections on the display screen. The display screen and the joystick ball are both capable of being coupled in data transmission relation to a processing unit wherein the screen output, the joystick ball output, or both the screen output and joystick output may be processed.

28 Claims, 2 Drawing Sheets

TEACH PENDANT FOR AN INDUSTRIAL ROBOT

BACKGROUND OF THE INVENTION

1. Field of the Invention

The present invention relates to devices for operating an industrial robot. More particularly, the present invention relates to hand-operated devices for controlling industrial robots when they are programmed or "taught" to follow an operating path.

2. Description of the Prior Art

Industrial robots may be controlled by various means including a control lever or joystick. Control of the robot is accomplished by converting the mechanical input from the joystick into electric signals, processing the signals in a processing unit, and using the processed signals to control various robot drivers such as servos and motors.

As is known, robots are used to carry out repetitious and precise tasks such as the welding of components together, painting components, and installing components into assemblies as they travel on assembly lines. Robots are programmed to carry out a work or working cycle along an operating path. In order to program or "teach" a robot its working cycle, the robot is manipulated along a desired operating path to various positions. These positions are stored as instructions in, for example, electronic memory. Other information may be stored in memory as well, such as the desired robot velocity in a certain section of movement along the desired operating path, the conditions for robot movement in response to input from sensors, and so on. During operation of the robot, the program instructions are executed, thereby causing the robot to operate as desired.

Programming of a robot is often carried out by personnel who lack special programming training. In addition, the faster programming can be accomplished, the sooner robots may be put into use. Therefore, it is important that programming be a relatively simple and fast task.

Various devices used to facilitate the programming of robots are known in the art. For example, U.S. Pat. No. 4,888,708, issued to Brantmark et al., discloses a control system for a programmable industrial robot having a joystick and a memory for storage of instructions. The system also includes a keyboard and a visual display unit. The keyboard has various function keys which permit an operator to select various states for the control system. Various other keys each with a fixed function and numerical keys for storing data such as the speed of displacement of the robot, idle time, positional displacement, or the like are provided. A microprocessor is coupled in data-transmission relation to the keyboard and senses the various positions of its keys.

While the above-noted system is functional, it is not optimal. User-friendly, graphical interfaces, such as the one produced by Windows™ software, are difficult to use with it. Accordingly, there is a need for an industrial robot programming device, or operating unit, which is easier to use and may be used with such interfaces.

OBJECTS AND SUMMARY OF THE INVENTION

Therefore, it is an object of the present invention to provide an improved programmable robot operating unit which is usable with graphical-user interfaces.

A further object of the present invention is to provide an improved programmable robot operating unit which integrates a pointing device for making selections on the graphical-user interface.

A further object of the present invention is to provide an improved programmable robot operating unit which combines joystick control with the ability to select various options and inputs on a graphical-user interface.

These and other objects and advantages are achieved in an operating unit for a programmable industrial robot which includes a body which is preferably sized and shaped so as to be readily portable and may be sized to fit in the palm of a user's hand. A display screen is mounted on the body and is operable to present graphical information items and produce a screen output. An operator may make selections of the items presented on the screen. In the preferred embodiment, the display screen is touch sensitive. A joystick ball is mounted on the body, and is used to control the robot during a programming phase. During the programming phase the robot is programmed or taught to follow an operating path. The joystick ball has a joystick mounting means and is capable of producing a joystick ball output.

A pointing device is removably mounted to the joystick mounting means and is capable of being used as a joystick lever and to make selections on the touch sensitive screen. The touch sensitive screen and the joystick ball are both capable of being coupled in data transmission relation to a processing unit wherein the screen output, the joystick output, or both the screen output and joystick ball output may be processed.

The operating unit may also include a safety switch. The safety switch operates to shut off signals from the joystick ball to the robot. It may be coupled between the joystick ball and the processing unit or between the transducers in the joystick ball and the joystick ball output. The safety switch operates to prevent accidental movement of the robot when selections are being made on the display screen. When the pointing device is removed from the joystick mounting means, the safety switch opens, thereby shutting off output from the joystick ball. When the pointing device is mounted to the joystick mounting means the safety switch closes, thereby permitting output from the joystick ball to be transmitted to the processing unit.

Preferably, the joystick ball is capable of enabling the pointing device to move in at least six degrees of freedom so that the robot may be controlled in at least three directions. X-Y or horizontal control is accomplished by movement of the pointing device in an X-Y plane. Z or vertical control is accomplished by other means, such as rotating the pointing device around its longitudinal axis. In this manner at least three directions of movement can be controlled.

Various information may be presented on the display screen and various programming inputs may be made. In one form of the present invention, fixed and variable functions may be selected from graphical information presented on the display screen. The graphical information on the display screen may be presented in the form of icons.

Further objects and advantages of the present invention will become more apparent from the following detailed description of the preferred embodiment taken in combination with the accompanying drawings.

DESCRIPTION OF THE PREFERRED EMBODIMENT

Figure 1:
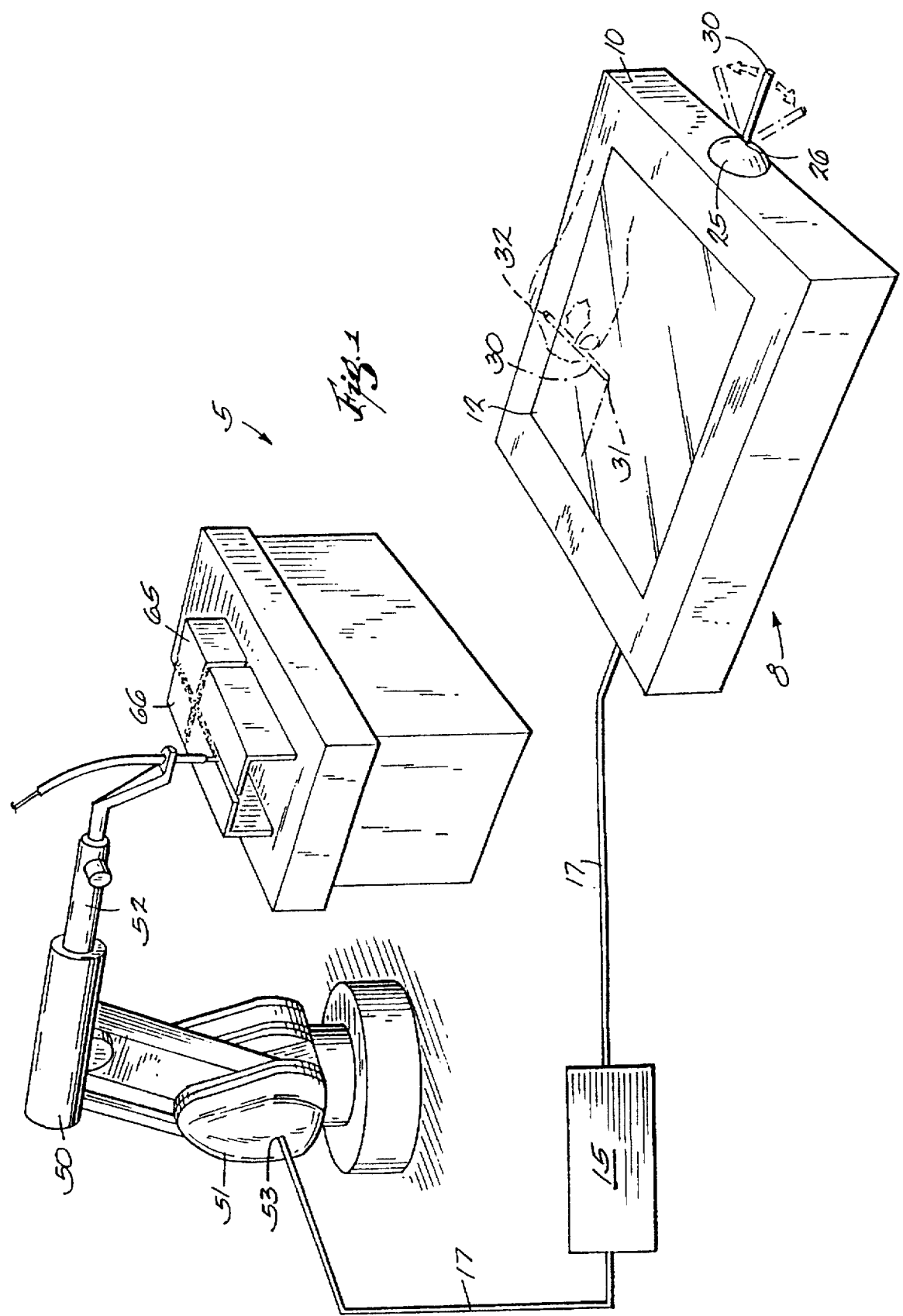
FIG. 1 is a perspective view, partially schematic, of a programmable industrial robot and control system for use therewith, including an operating unit constructed according to one embodiment of the present invention.

Referring more particularly to the drawings, a control system 5 is shown in schematic form in FIG. 1. The control system 5 includes an operating unit 8, which is shown in perspective. The control system also includes a processing unit, discussed below. The control system is coupled in data transmission relation to a programmable robot (also discussed below). The programming of such robots during a programming stage in order to teach the robot an operating path is known in the art and explained in U.S. Pat. No. 4,888,708, which is hereby incorporated by reference.

The operating unit 8 includes a body 10 and a display screen 12 which is preferably a touch sensitive screen. However, the display screen 12 could be responsive to light, proximity, or other inputs. The display screen 12 may display a graphical-user interface generated by software such as Windows™, which may be run on a microprocessor (not shown) electrically coupled to the screen. The graphical-user interface may include icons and other information items which may be selected. These icons may represent various fixed and variable functions for the control system 5. Programming of different functions may be made by selections on the display screen 12.

Figure 2:
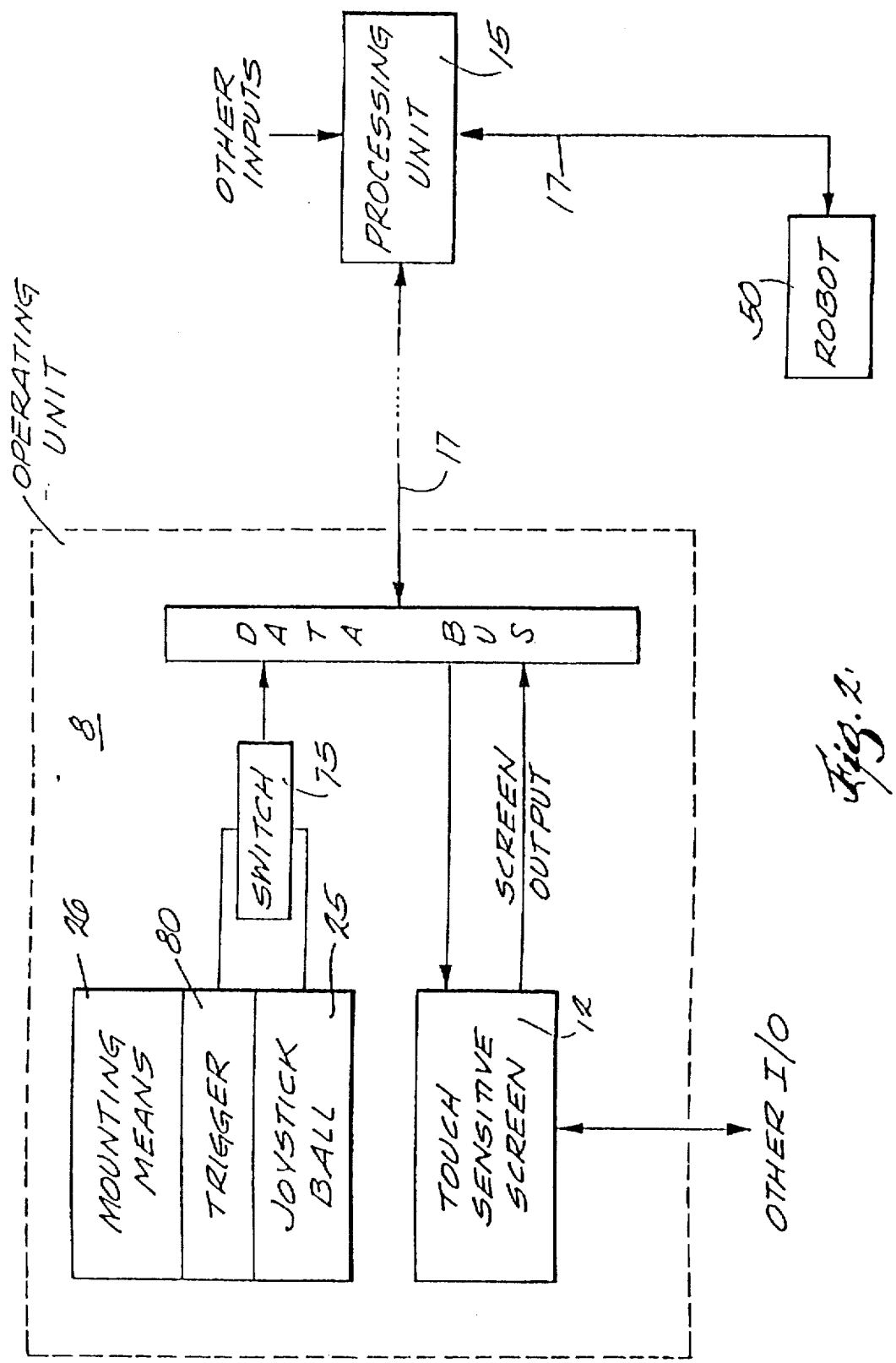
FIG. 2 is a block diagram of the operating unit of the present invention and shows data communication among the various components of the operating unit and control system.

The display screen produces output data or a screen output (FIG. 2). The screen output, which may, for example, represent the function selections made on the display screen, is transmitted to a to a processing unit 15 via a communication cable or link 17. The processing unit 15 is capable of receiving, processing, and outputting data. It may be one of many presently available microprocessors or computers and includes a memory for storing the information sent to it from the display screen 12 and the joystick ball (discussed below).

Mounted on the main body 10 of the operating unit 8 is a joystick ball 25. The joystick ball includes a joystick mounting means 26 which may take the form of a socket. A joystick or pointing device 30 having a first end 31 and a second end 32 is removably mounted to the joystick mounting means 26. In the preferred embodiment, the first end 31 is plugged into the socket which operates as the joystick mounting means 26. Various mechanisms for mounting the joystick or pointing device 30 to the joystick ball other than a socket may be used and are known to those skilled in the art.

The joystick ball 25 is rotatable and includes transducers which sense the motion of the pointing device 30. The mechanical input to the joystick ball created by moving the pointing device 30 is converted into a processable data signal. Using conventional electronics, the motion of the pointing device 30 is converted into digital signals which make up the joystick ball output (FIG. 2) and are transmitted along the link 17 to the processing unit 15. Motion in a horizontal, X-Y plane is controlled by deflection of the pointing device 30. Motion in a vertical, Z plane may be controlled by any suitable other means, such as rotation of the pointing device 30 around its longitudinal axis, or axial pressure along its longitudinal axis. If motion in a Z plane is controlled by rotation of the pointing device 30 about its longitudinal axis, the pointing device 30 or the joystick mounting means 26 or both are keyed or spliced or slotted to permit sliding insertion of the pointing device 30 into the socket, and yet prevent relative rotational movement between the pointing device 30 and the joystick ball 25.

As noted above, the pointing device 30 is removably mounted to the joystick mounting means 26. The pointing device 30 may be removed from the joystick mounting means 26 and used to make selections on the graphical-user interface presented on the display screen 12. As shown in FIG. 1, an operator may grasp the pointing device 30 and perform the same functions that a computer operator might perform with a computer mouse, including, for example, selecting and choosing items presented on the display screen, and manipulating pull-down menus and application windows.

Various information may be presented on the display screen and various programming inputs may be made. In one form of the present invention fixed and variable functions may be selected from graphical information presented on the display screen. Various operator interfaces may be presented on the screen. One interface may include a numerical keypad and menu presented side by side. By making an appropriate selection, another interface may be made to appear on the display screen. This second interface may include icons only. Thus, the present invention provides a flexibility in the types of input available and information displayed to the operator heretofore unachieved.

The joystick ball 25 is used to control the movement of an industrial robot 50. The robot 50 has a main body 51, a robot arm 52 and a data port or data input means 53. The robot 50 may, for example, be used to weld frame members 65 and 66. In order to facilitate programming of the robot 50, a safety switch 75 (FIG. 2) is coupled between the joystick ball and the processing unit. Alternatively, the safety switch may be coupled between the transducers in the joystick ball and the joystick ball output. The safety switch 75 operates to prevent accidental movement of the robot 50 when selections are being made on the touch sensitive screen 12. When the pointing device 30 is removed from the joystick mounting means 26, the safety switch 75 opens, thereby shutting off output from the joystick ball 25 and "freezing" the position of the industrial robot 50. When the pointing device 30 is mounted to the joystick mounting means 26 the safety switch 75 closes, thereby permitting output from the joystick ball 25 to be transmitted to the processing unit 15 and the robot 50 to be moved. A trigger 80 may be used to sense whether the pointing device 30 is mounted to the joystick mounting means. The trigger 80 may be used to open and close the safety switch 75.

While the present invention has been described in what is believed to be the most preferred form, it is to be understood that the invention is not confined to the particular construction and arrangement of the components herein illustrated and described, but embraces such modified forms thereof as come within the scope of the following claims.

What is claimed is:

1. An operating unit for a programmable industrial robot that is coupled in data communication to a processing unit, the operating unit comprising:

a body;

a display screen for being coupled in data communication to the processing unit having a screen surface that is sensitive to movement of a pointing device over the screen surface, and mounted on the body, the display screen operable to present graphical information items, on which an operator may make selections of the items presented on the display screen, and to produce a screen output;

a joystick ball mounted on the body and coupled in data communication to the processing unit, the joystick ball for producing a joystick ball output and controlling the robot during a programming phase during which the robot is taught to follow an operating path, the joystick ball having a joystick mounting means; and a pointing device removably mounted to the joystick mounting means and for making selections on the display screen;

wherein the screen output, the joystick ball output, or both the screen output and joystick output are transmitted to the processing unit.

2. An operating unit as claimed in claim 1, the operating unit further comprising a safety switch operable to prevent the transmission of the joystick ball output to the processing unit.

3. An operating unit as claimed in claim 1, wherein the joystick ball is capable of enabling the pointing device to move in at least three degrees of freedom for controlling the robot in at least three directions.

4. An operating unit as claimed in claim 3, wherein the pointing device, when mounted to the joystick mounting means, is capable of rotating around its longitudinal axis for controlling the robot in one of the directions.

5. An operating unit as claimed in claim 1, wherein the pointing device is keyed, slotted, or splined.

6. An operating unit as claimed in claim 1, wherein fixed and variable functions may be selected from graphical information presented on the display screen.

7. An operating unit as claimed in claim 6, wherein the graphical information on the display screen is presented in the form of icons.

8. An operating unit as claimed in claim 1, wherein the body is capable of being held in an operator's hand.

9. A control unit for use with a programmable industrial robot, the control unit comprising:

a processing unit for receiving, processing, and outputting data;

a body;

a display screen mounted on the body and having a screen surface that is sensitive to movement of a pointing device over the screen surface, the display screen operable to present graphical information items, on which an operator may make selections of the items presented on the display screen, capable of producing a screen output, and coupled in data transmission relation to the processing unit;

a joystick ball mounted on the body for controlling the robot during a programming phase during which the robot is taught to follow an operating path, the joystick ball having a joystick mounting means, for producing a joystick ball output, and coupled in data transmission relation to the processing unit; and a pointing device removably mounted to the joystick mounting means and for being used to make selections on the display screen.

10. An operating unit as claimed in claim 9, the operating unit further comprising a safety switch operable to prevent the transmission of the joystick ball output to the processing unit.

11. An operating unit as claimed in claim 9, wherein the joystick ball is capable of enabling the pointing device to move in at least three degrees of freedom for controlling the robot in at least three directions.

12. An operating unit as claimed in claim 11, wherein the pointing device, when mounted to the joystick mounting means, is capable of rotating around its longitudinal axis for controlling the robot in one of the directions.

13. An operating unit as claimed in claim 9, wherein the pointing device is keyed, slotted, or splined.

14. An operating unit as claimed in claim 9, wherein fixed and variable functions may be selected from graphical information presented on the display screen.

15. An operating unit as claimed in claim 9, wherein the graphical information on the display screen is presented in the form of icons.

16. An operating unit as claimed in claim 9, wherein the body is capable of being held in an operator's hand.

17. A programmable industrial robot comprising a main body;

a robot arm coupled to the main body;

data input means coupled in data transmission relation to the programmable industrial robot; and a control unit including:

a processing unit for receiving, processing, and outputting data, and coupled in data transmission relation to the data input means;

a body;

a display screen mounted on the body and having a screen surface sensitive to the movement of a pointing device over the screen surface, operable to present graphical information items, on which an operator may make selections of the items presented on the display screen, for producing a screen output, and coupled in data transmission relation to the processing unit;

a joystick ball mounted on the body for controlling the robot during a programming phase during which the robot is taught to follow an operating path, the joystick ball having a joystick mounting means, for producing a joystick ball output, and coupled in data transmission relation to the processing unit; and a pointing device removably mounted to the joystick mounting means and for being used to make selections on the display screen.

18. A programmable industrial robot as claimed in claim 17, wherein the operating unit further comprises a safety switch operable to prevent the transmission of the joystick ball output to the processing unit.

19. A programmable industrial robot as claimed in claim 17, wherein the joystick ball is capable of enabling the pointing device to move in at least three degrees of freedom for controlling the robot in at least three directions.

20. A programmable industrial robot as claimed in claim 19, wherein the pointing device, when mounted to the joystick mounting means, is capable of rotating around its longitudinal axis for controlling the robot in one of the directions.

21. A programmable industrial robot as claimed in claim 17, wherein the pointing device is keyed, slotted, or splined.

22. A programmable industrial robot as claimed in claim 17, wherein fixed and variable functions may be selected from graphical information presented on the display screen.

23. A programmable industrial robot as claimed in claim 17, wherein the graphical information on the display screen is presented in the form of icons.

24. A programmable industrial robot as claimed in claim 17, wherein the body is capable of being held in an operator's hand.

25. A method of programming a programmable industrial robot, the robot having a an operating unit which includes: a body; a display screen having a screen surface and mounted on the body, operable to graphically display information items, on which an operator may make selections of the items presented on the display screen, and capable of producing a screen output; a joystick ball mounted on the body for controlling the robot during a programming phase during which the robot is taught to follow an operating path, the joystick ball having a joystick mounting means and capable of producing a joystick ball output; and a pointing device removably mounted to the joystick mounting means and capable of being used to make selections on the display screen; the method comprising the steps of:

creating a mechanical input to the joystick ball by moving the pointing device, the mechanical input being converted into a processable data signal, in order to control the movement of the robot; and making selections on the display screen with the pointing device by removing the pointing device from the joystick ball and moving it over the screen surface.

26. An operating unit for a programmable industrial robot that is coupled in data communication to a processing unit, the operating unit comprising:

a body;

a display screen for being coupled in data communication to the processing unit, having a screen surface that is sensitive to movement of a pointing device over it, and mounted on the body, the display screen operable to graphically display information items, on which an operator may make selections of the items presented on the display screen, and to produce a screen output;

a joystick ball mounted on the body and coupled in data communication to the processing unit, the joystick ball for producing a joystick ball output and controlling the robot during a programming phase during which the robot is taught to follow an operating path, the joystick ball having a joystick mounting means;

a pointing device removably mounted to the joystick mounting means and for making selections on the display screen; and means for sensing whether the pointing device is mounted to the joystick mounting means;

wherein the screen output, the joystick ball output, or both the screen output and joystick output are transmitted to the processing unit.

27. An operating unit as claimed in claim 26, the operating unit further comprising means for preventing the transmission of the joystick ball output to the processing unit when the pointing device is removed from the joystick mounting means.

28. An operating unit for a programmable industrial robot that is coupled to a processing unit, the operating unit comprising:

a body;

a display screen for being coupled in data communication to the processing unit, having a screen surface that is sensitive to movement of a pointing device over it, and mounted on the body, the display screen operable to graphically display information items, on which an operator may make selections of the items presented on the display screen, and to produce an output;

a multi-directional mount on the body and coupled in data communication to the processing unit, the multi-directional mount for producing an output and controlling the robot during a programming phase during which the robot is taught to follow an operating path;

a pointing device removable mounted to the multi-directional mount and for making selections on the display screen;

wherein, the screen output, the output of the multi-directional mount, or both are transmitted to the processing unit.

* * * * *